(12) United States Patent
Nobukiyo

(10) Patent No.: US 6,879,285 B2
(45) Date of Patent: Apr. 12, 2005

(54) STORE INFORMATION DISPLAY SYSTEM AND A DISPLAY METHOD

(75) Inventor: Takahiro Nobukiyo, Tokyo (JP)

(73) Assignee: NEC Corporation (JP)

(*) Notice: Subject to any disclaimer, the term of this patent is extended or adjusted under 35 U.S.C. 154(b) by 444 days.

(21) Appl. No.: 09/995,188

(22) Filed: Nov. 26, 2001

(65) Prior Publication Data

US 2002/0065068 A1 May 30, 2002

(30) Foreign Application Priority Data

Nov. 28, 2000 (JP) .......................................... 2000-361210

(51) Int. Cl.[7] .............................................. H04B 7/185
(52) U.S. Cl. ............................... 342/357.09; 342/357.1; 701/207; 455/414.3
(58) Field of Search .......................... 455/404.2, 414.1, 455/414.2, 414.3, 421, 427, 456.1, 456.3; 705/14; 725/60; 701/201, 207, 210, 212, 208, 202, 213, 214; 345/955.1, 955.12; 340/901, 945; 342/357.09, 357.1

(56) References Cited

U.S. PATENT DOCUMENTS

| | | | | |
|---|---|---|---|---|
| 6,133,853 | A | * 10/2000 | Obradovich et al. | 340/905 |
| 6,148,261 | A | * 11/2000 | Obradovich et al. | 701/208 |
| 6,552,682 | B1 | * 4/2003 | Fan | 342/357.09 |
| 2002/0167442 | A1 | * 11/2002 | Taylor | 342/357.09 |
| 2003/0212996 | A1 | * 11/2003 | Wolzien | 725/60 |

FOREIGN PATENT DOCUMENTS

| | | |
|---|---|---|
| JP | 6-223117 | 8/1994 |
| JP | 8-76706 | 3/1996 |
| JP | 9-244566 | 9/1997 |
| JP | 10-66149 | 3/1998 |
| JP | 11-4474 | 1/1999 |
| JP | 11-51666 | 2/1999 |
| JP | 11-65434 | 3/1999 |

OTHER PUBLICATIONS

Japanese Office Action issued Aug. 3, 2004, (w/relevant English translation).

* cited by examiner

Primary Examiner—Scott L. Weaver
(74) Attorney, Agent, or Firm—Dickstein, Shapiro, Morin & Oshinsky, LLP.

(57) ABSTRACT

In a store information display system comprising a mobile unit terminal connected to the communication network, a store information control apparatus connected to the communication network, a receiving means for receiving positioning data of the mobile unit terminal and retrieval conditions from the mobile unit terminal, a store information retrieval means for establishing a retrieval area in a direction of travel of the mobile unit terminal and performing retrieval of stores information within the retrieval area, a retrieval area adjusting means for adjusting dimensions of the retrieval area, and a stores information transmitting means for transmitting stores information founded by the store information retrieval means to the mobile unit terminal, are provided.

7 Claims, 18 Drawing Sheets

FIG. 4

(STORE REGISTRATION INFORMATION)

| |
|---|
| ADDRESS<br>>HODOGAYA-KU, YOKOHAMA<br>  XX-CHO, YY BANCHI — 261 |
| STORE TYPE<br>>STEAK HOUSE — 262 |
| STORE ADDRESS<br>(TELEPHONE NUMBER, IP ADDRESS)<br>>045-XXX-XXXX — 263 |
| STORE ADVERTISING INFORMATION<br>>STORE TYPE: STEAK HOUSE<br> STORE NAME: YOKOYOKOYA<br> MAP OF SURROUNDING AREA<br> MAIN MENU ITEMS<br> STORE CROWDING<br> SALES POINT: FRESH MEAT — 264 |

FIG. 5

| |
|---|
| MOBILE UNIT ADDRESS<br>(TELEHONE NUMBER, IP ADDRESS)<br>>090-YYY-YYYY |

FIG. 6

| | |
|---|---|
| 281 — DESIRED TYPE OF SHOP<br>>STEAK HOUSE | INITIAL RETRIEVAL DISTANCE<br>(WITHIN 60 km/hr)<br>>4.0 km — 285 |
| 282 — DESTINATON<br>>**DISCOUNT<br>FUTAMATAGAWA BRANCH<br>(XX-CHO, ASAHI-KU, YOKOHAMA) | INITIAL RETRIEVAL DISTANCE<br>(60 km/hr OR GREATER:HIGHWAY)<br>>10.0 km — 286 |
| 283 — UPPER LIMIT ON NUMBER OF<br>RECEIVED STORE INFORMATION<br>>5 | RETRIEVAL DISTANCE EXTENSION<br>MULTIPLIER<br>>1.5 TIMES — 287 |
| 284 — LOWER LIMIT ON NUMBER OF<br>RECEIVED STORE INFORMATION<br>>3 | RETRIEVAL DISTANCE SHORTENING<br>MULTIPLIER<br>>0.5 TIMES — 288 |
| | TRANMISSION INTERVAL OF<br>POSITION INFORMATION<br>>20 MINUTES — 289 |
| | RETRIEVAL AREA MOVEMENT<br>DISTANCE<br>>INITIAL RETRIEVAL DISTANCE × 1/4 — 290 |

| EAST LONGITUDE | NORTH LATITUDE | | |
|---|---|---|---|
| | 35° 45′50″ | ......... | 36° 01′20″ |
| 139° 40′10″ | ROUTE 16 | ......... | |
| ⋮ | | | |
| 140° 10′05″ | ROUTE 16<br>SHOP A | ......... | ROUTE 20 |

STORE INFORMATION DISPLAY SYSTEM AND A DISPLAY METHOD

BACKGROUND OF THE INVENTION

1. Field of the Invention

The present invention relates to a store information display system which retrieves information for a store along a road or the like and displays thereof.

2. Related Art

When traveling in an unfamiliar area or rambling about such areas, there are many cases in which is it necessary to know about what kinds of stores are located along a road which is being traveled, or in the surrounding area. For example, there are cases in which when traveling by car it is necessary to search a restaurant for lunch or supper or a gas station. For this purpose, there has been proposed a store information display system in which information about a store is retrieved and displayed.

FIG. 22 of the accompanying drawings shows a general view of such a store information display system of the past. In this system, disclosed in Japanese Unexamined Patent Publication (KOKAO) No.8-76796, a store 101 has a communication apparatus 102 and an electronic advertisement transmitter 103. The store 101 is connected to a mobile control center 105 via a public network 104, and the public network 104 is connected to a mobile-unit 107, by a wireless communication means 106. The mobile control center 105 is formed by a store database 111, into which is stored data of the store, a mobile control database 112, into which is stored data of the mobile unit 107, a proximity detection apparatus 113, which detects the approach of a mobile unit, and a communication apparatus 114. The mobile unit 107 has a position detection apparatus 115, which detects its position, an electronic advertisement receiver 116, which receives an electronic advertisement, and a mobile communication apparatus 117 for performing communication. The position detection apparatus 115 detects it's position using the GPS (Global Positioning System) 118.

Consider the case in which, in the store information display system of FIG. 22, the store 101 is a coffee shop and the mobile unit 107 is an automobile. The direction of movement of the mobile unit 107 is detected by the position detection apparatus 115, and the mobile communication apparatus 117 notifies detected positioning data to the mobile control center 105. As a result, the mobile unit 107 receives an electronic advertisement from a plurality of coffee shops, making it possible to select a coffee shop with favorable conditions and receive service therefrom.

In a conventional store information display system as described above, the mobile control center 105 collects information with regard to stores close by the mobile unit 107, and distributes this information to a mobile unit 107. Therefore, in the case for example in which the mobile unit 107 is traveling in a remote location, there is often no coffee shop within the prescribed distance from the mobile unit 107, so that displays are infrequent. Additionally, if only a single coffee shop or so is displayed, it is not possible to select a desire shop from a plurality of coffee shops.

If the mobile unit 107 is traveling in a region in which there are a large number of closely clustered high-rise buildings or department stores, there will be a very large number of coffee shops within the prescribed distance from the mobile unit 107. Thus, there will be an unorganized display of a large number of coffee shops, thereby possibly making it difficult to make a selection. In the case in which a search is being made for coffee shop that is a operated as member of a chain of such shops, there can be a case in which a plurality of shops having the same name are displayed, leading to the situation in which, rather than selecting a nearby shop, a distant shop, or a shop in the opposite direction of the direction of travel could be selected, thereby resulting in wasted effort.

Additionally, viewed from the standpoint of a store 101, because in an region with many stores there will be a large number of competing stores 101, the effectiveness of advertising becomes a problem. For a store 101 in a remote and isolated region, even if an advertisement is created to set the store apart from other stores 101, there are many cases in which only one store close by the mobile unit 107 will be displayed, making it difficult for a store 101 to attract customers away from the competing stores.

Accordingly, it is an object of the present invention to provide a store information display system capable of displaying only an appropriate number of stores positioned in an area surrounding a mobile terminal.

SUMMARY OF THE INVENTION

To achieve the above-noted objects, the present invention adopts the following described technical constitution.

Specifically, the first aspect of the present invention is a store information display system comprising: a communication network; a mobile unit terminal, connected to the communication network, having position detection means which detects position thereof; a store information control apparatus, connected to the communication network; a receiving means, provided in the store information control apparatus, for receiving positioning data detected by the position detection means and retrieval conditions with respect to a request of a retrieval of store information from the mobile unit terminal; a store information retrieval means, provided in the store information control apparatus, for establishing a retrieval area in a direction of travel of the mobile unit terminal based on the received positioning data of the mobile unit terminal and the retrieval conditions, and performing retrieval of stores information within the retrieval area; a retrieval area adjusting means, provided in the store information retrieval means, for adjusting dimensions of the retrieval area in accordance with retrieval conditions received from the mobile unit terminal; and a stores information transmitting means, provided in the store information control apparatus, for transmitting stores information founded by the store information retrieval means to the mobile unit terminal.

In the second aspect of the present invention, the retrieval area is a region surrounded by a circle.

In the third aspect of the present invention, a center of the retrieval area is established based on a traveling speed of the mobile unit terminal.

In the fourth aspect of the present invention, a center of the retrieval area is a location at which the mobile unit terminal has moved a prescribed distance along a path of movement thereof after receiving a request for store information retrieval from the mobile unit terminal.

In the fifth aspect of the present invention, the retrieval conditions includes upper limit value which limits a number of store information displayed on the mobile unit terminal, the retrieval area adjusting means adjusting the dimensions of the retrieval area in accordance with the upper limit value and a number of store information founded by last retrieval.

In the sixth aspect of the present invention, the retrieval conditions includes lower limit value which limits a number of store information displayed on the mobile unit terminal, the retrieval area adjusting means adjusting the dimensions of the retrieval area in accordance with the lower limit value and a number of store information founded by last retrieval.

The seventh aspect of the present invention is a display method of a store information using a store information display system comprising a communication network, a mobile unit terminal, connected to the communication network, having position detection means which detects position thereof, and a store information control apparatus connected to the communication network, the method comprising the steps of: receiving a request for store information retrieval, positioning data detected by the position detection means and retrieval conditions with respect to the retrieval of store information from the mobile unit terminal; calculating a traveling speed of the mobile unit terminal; calculating a location at which the mobile unit terminal has moved a prescribed distance along a path of movement thereof after receiving the request for store information retrieval from the mobile unit terminal; establishing a retrieval area in a direction of travel of the mobile unit terminal based on the received positioning data of the mobile unit terminal and the retrieval conditions; performing retrieval of stores information within the retrieval area; adjusting dimensions of the retrieval area in accordance with retrieval conditions received from the mobile unit terminal and retrieval results obtained by last retrieval; and transmitting stores information founded by the retrieval to the mobile unit terminal.

BRIEF DESCRIPTION OF THE DRAWINGS

FIG. 4 is a drawing illustrating an example of store information registered in a store database by the registration processing shown in FIG. 3.

FIG. 5 is a drawing illustrating the data items registered in the database of the mobile unit terminal by the registration processing.

FIG. 6 is a drawing showing items that are set at the time of retrieval of the store information.

FIG. 7 is a drawing showing an address database provided in the store information display system of the present invention.

DETAILED DESCRIPTION OF THE PREFERRED EMBODIMENTS

Embodiments of the present invention are described in detail below, with references made to relevant accompanying drawings.

(First Embodiment)

Figure 1:
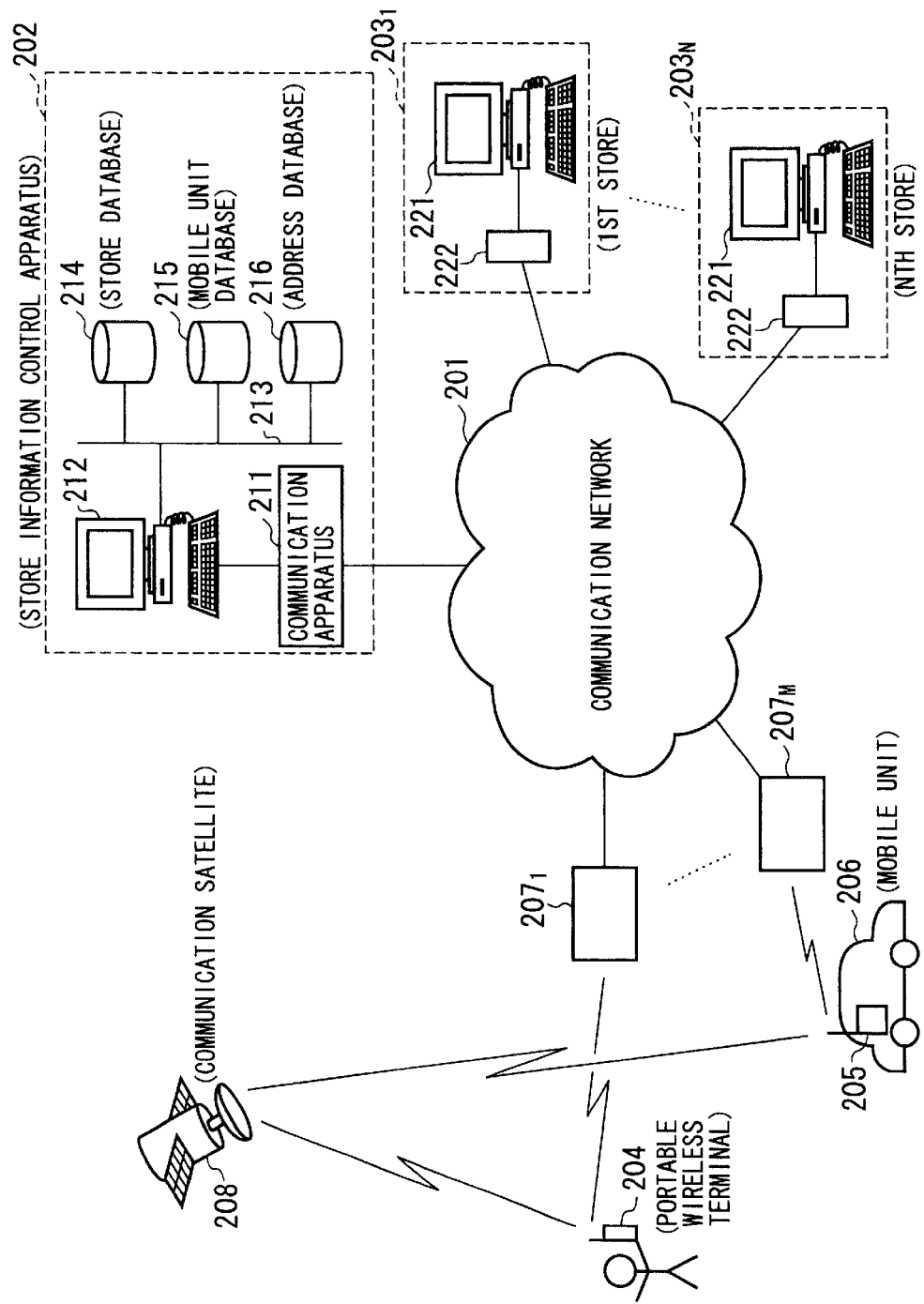
FIG. 1 is a block diagram of a store information display system according to the present invention.

Specifically, FIG. 1 shows the configuration of a store information display system according to the present invention. This store information display system is made up of a store information control apparatus 202 connected to a communication network 201, 1st to Nth stores $203_1$ to $203_N$, which have entered into a prescribed paid contract with the store information control apparatus 202, a mobile unit 206 having a portable wireless terminal 204 and wireless terminal 205 registered to receive service from the store information display system, base stations $207_1$ to $207_M$ for the purpose of making wireless connections to the portable wireless terminal 204, the wireless terminal 205, and the communication network 201, and communication satellite for the Global Positioning System (GPS).

The store information control apparatus 202 has a computer 212 connected to the communication network 201 via the communication apparatus 211, a store database 214, a mobile unit database 215, and an address database 216 connected to the computer 212 via a LAN (local area network) cable 213. The 1st to Nth stores $203_1$ to $203_N$ each have a personal computer 221 and a communication apparatus 222 such as a modem or router or the like.

Figure 2:
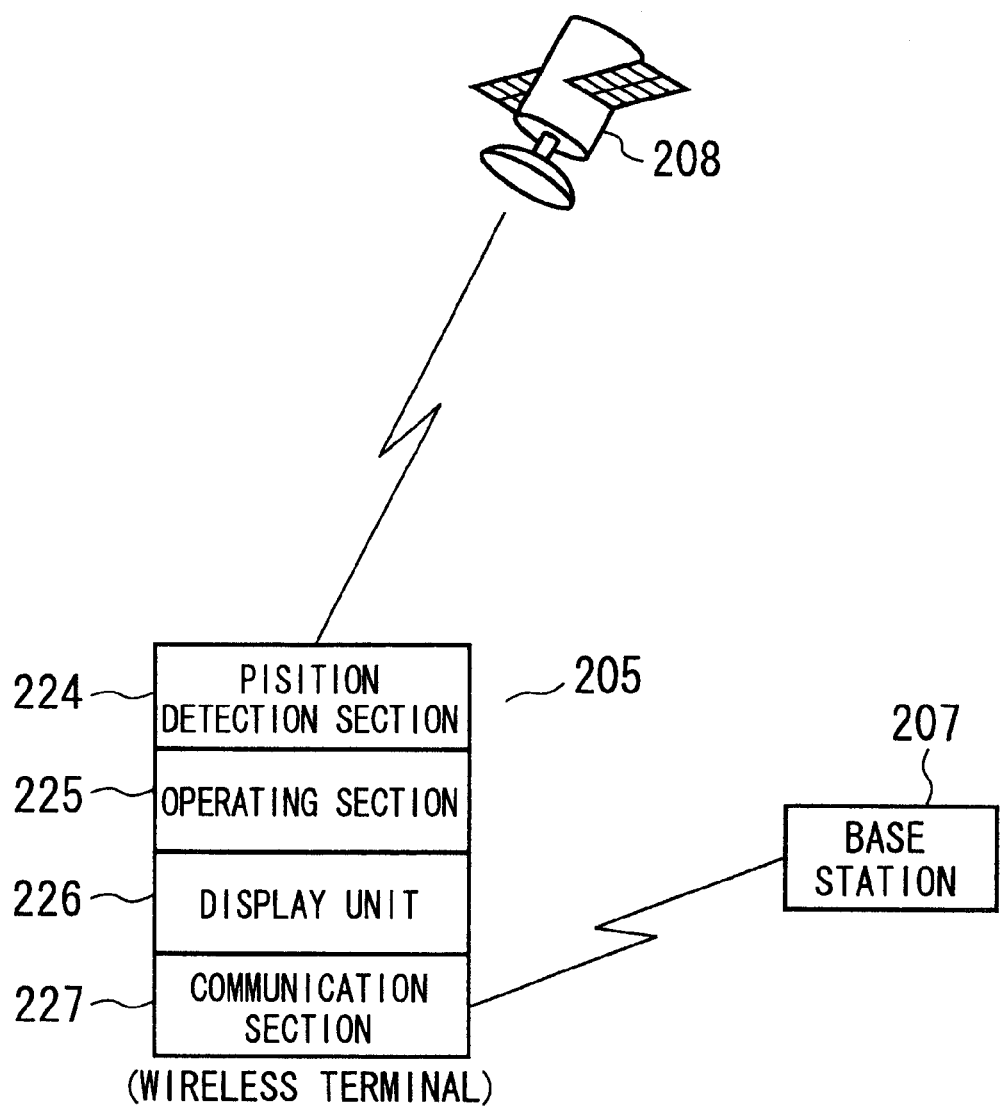
FIG. 2 is a block diagram of the wireless terminal of FIG. 1.

FIG. 2 shows the conceptual configuration of the wireless terminal 204, 205. Because the configurations of the portable wireless terminal 204 and the wireless terminal 205 in this embodiment are basically the same, the configuration of the wireless terminal 205 is be described below.

The wireless terminal 205 has a position detection section 224, which detects the current position by communicating with the communication satellite 208, an operating section 225, which performs various input operations, a display unit 226, which displays visually or audibly information such as store information, and a communication section 227, which performs communication with the base station 207. These various sections are controlled by a CPU (central processing unit, not shown in the drawing) installed in the wireless terminal 205 and a program (control means) stored in a ROM (read only memory, not shown in the drawing) provided within the wireless terminal 205.

In this embodiment, the detection of the current position of the portable wireless terminal 204 and the wireless terminal 205 is performed using the communication satellite 208, and it will be understood that, for example, detection of the position is possible by a known method, for example a method of comparing the signal level received at the base stations with reference signal.

Figure 3:
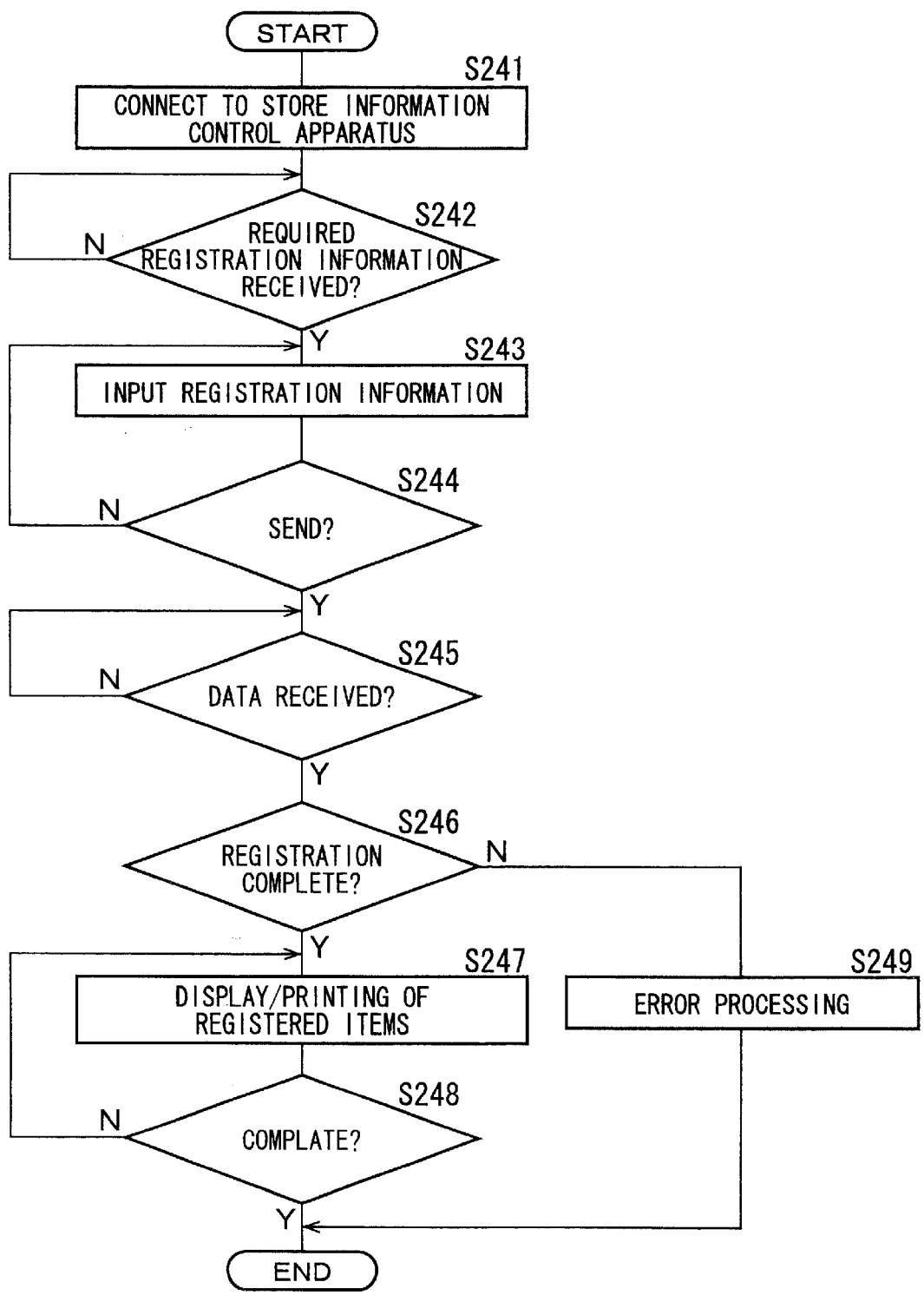
FIG. 3 is a flowchart illustrating the registration processing at the store information control apparatus according to the present invention.

FIG. 3 is the flowchart showing registration of a store in this store information display system for the example of a 1st store. The personal computer 221 provided in the store $203_1$ of FIG. 1 is connected to the store information control apparatus 202 using the communication apparatus 222, via the communication network 201 (step S241). Then, information requiring registration is received from store information control apparatus 202 (Y result as step S242), based upon received information, the store registration information is input from the personal computer 221 (step S243). Then, after a check is made of the input contents on a screen (not shown in the drawing), the store registration information is sent to the store information control apparatus 202 (step S244).

If a registration page is prepared on an Internet website by the store information control apparatus 202, the above-noted operations can be performed by the operation of pressing a transmit button (not shown in the drawing) after inputting store registration information to a displayed form. In performing the registration, it is important to issue a store password to assure security.

When the store registration information is sent to the store information control apparatus 202 in the above manner, the store information control apparatus 202 performs registration thereof into the store database 214, the results of this processing being sent to the 1st store $203_1$. When the above-mentioned results are received at the personal computer 221 of the 1st store $203_1$ (Y result at step S245), the contents thereof are interpreted and a judgment is made as to whether or not registration has been completed (step S246). If the result of this judgment is that the registration has been completed (Y result), the registered items are display on the display unit of the personal computer 221. In this condition, it is also possible to print the store registration information (step S247). If the operator ends the processing at the first store $203_1$ (step S248), the registration processing is ended. In the case in which the result at step S246 is that the registration has not been completed (N result at step S246), the prescribed error processing is performed (step S249).

FIG. 4 shows an example of store registration information registered in the store database 214 by the registration processing shown in FIG. 3. The store registration information is made up of the store location 261 at which the store exists, the type of store 262, an address of the store on a communication network (telephone number or Internet protocol address, or URL (uniform resource locator) 263 or the like, and information 264 to be used in advertising the store.

The processing of retrieval and display of a store based on the store registration information is as follows. The processing performed by the user of a portable wireless terminal 204 or a wireless terminal 205 is divided up into registration performed directly by the user and usage information setting processing performed for a specification or a change of the usage information. Because each of these processing are the same as the flow of registration processing at the store in FIG. 3, they are not specifically illustrated.

In the case of either direct user registration processing or usage information setting processing, the user of the wireless terminal 205 accesses the store information control apparatus 202 via the communication network 201 and, in the case of registration, performs inputs a telephone number or IP address of his or her own mobile unit, and performs registration processing. Although a user number can be issued, this processing is not required in a case in which it is possible to identify each of the terminals themselves. If the user registration is not done, the store retrieval information using the store information display system according to the present invention is not sent to the wireless terminal 205.

FIG. 5 shows the data items registered into the mobile unit database 215 by the registration processing. FIG. 6 shows an example of the contents set at the time of usage information setting processing. The setting contents are the store type 281 that is to be retrieved, the target area 282, the upper limit value 283 and lower limit value 284 of the number of displayed stores, the initial retrieval distance 285 on a general road when performing a store retrieval, the initial retrieval distance 286 on a highway, a retrieval distance extension multiplier 287, a retrieval distance shortening multiplier 288, a transmission interval of the position information from the store information control apparatus 202, and the movement distance 290 of the retrieval area.

In this system, the retrieval distance extension multiplier 287 is the multiplier for extending the distance (radius) of the target area of the retrieval in the case in which the retrieval results yield a number of stores that is fewer than the lower limit 284, and the retrieval distance shortening multiplier 288 is the multiplier for shortening the distance (radius) of the target area of the retrieval in the case in which the retrieval results yield a number of stores that is greater than the upper limit 283. The retrieval movement distance 290 is the movement (shift) distance of the retrieval area, to be described below, accompanying movement of the wireless terminal such as the mobile unit 206.

FIG. 7 shows part of the contents of the address database 216 provided at the store information control apparatus 202. The address database 216 has stored in it information that converts latitudes and longitudes to corresponding roads, stores, and public facilities or the like. In a location in which there are no roads for pedestrians or vehicles, however, such as at sea, on a river, or on a lake, data is not stored, thereby reducing the overall capacity required for data storage. If even part of a road exists within a rectangular region defined by a prescribed latitude and longitude, information such as corresponding roads, stores, and public facilities or the like are stored. In the case in which a number of roads cross or run parallel to one another within a rectangular region, the information for each is stored.

Figure 8:
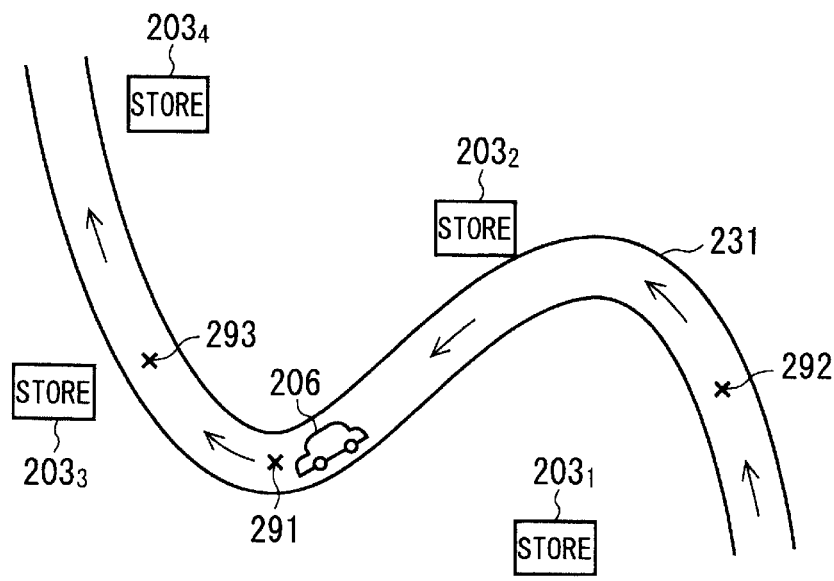
FIG. 8 is a map showing an example of part of a road and stores in the vicinity thereof.

FIG. 8 shows an example of apart of a road 231 and stores $203_1$–$203_4$ along the road. Based on this drawing, the processing for performing the desired store display is performed as follows. The mobile unit 206 travels in the direction indicated by the arrows in the drawing, and issues a request for store information display to the store information control apparatus 202. In this embodiment, the store information control apparatus 202 predicts the movement direction and movement speed of the mobile unit 206, retrieves stored registration information with regard to stores $203_1$, $203_2$ and so on existing in the area surrounding the path of movement, and sends this information to the user.

Figure 9:
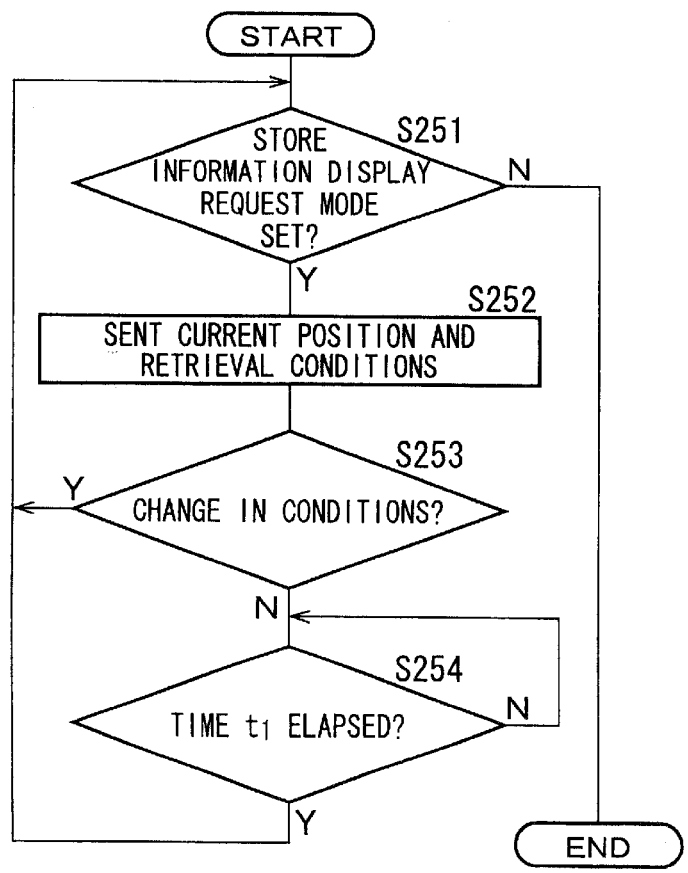
FIG. 9 is a flowchart showing the transmission processing in which the mobile unit terminal is in the store information display request mode.

FIG. 9 shows the flow of the transmission processing of the mobile unit in the above-noted case. In the transmission processing of the mobile unit, a judgment is made periodically as to whether or not the mobile unit 206 has set in the store information display request mode (step S251). In the case in which the store information display request mode has been set, position information of the mobile unit 206 which the position detection section 224 detects and retrieval conditions for displaying stores are sent to the store information control apparatus 202 (step S252).

The retrieval conditions noted above are conditions with regard to what type of, and how many, stores are to be displayed, and it is possible for a user to freely change these conditions at any time from the terminal. When the user changes the retrieval conditions (Y result at step S253), as long as the store information display request mode has not been disabled (Y result at step S251), changed condition are immediately sent to the store information control apparatus 202 (step S252). In the case in which there was no change in the retrieval conditions, or the default conditions are held, each time the time t1 elapses (Y result at step S254) the mobile unit 206 sends the current position and the current retrieval conditions to the store information control apparatus 202.

In the case in which this store information display system finds a desired store, because there is no further need for a store display, the user can disable store information display request mode. By doing this (N result at step S251), the processing at the mobile unit 206 for displaying stores is stopped until the store information display request mode is again set.

Figure 10:
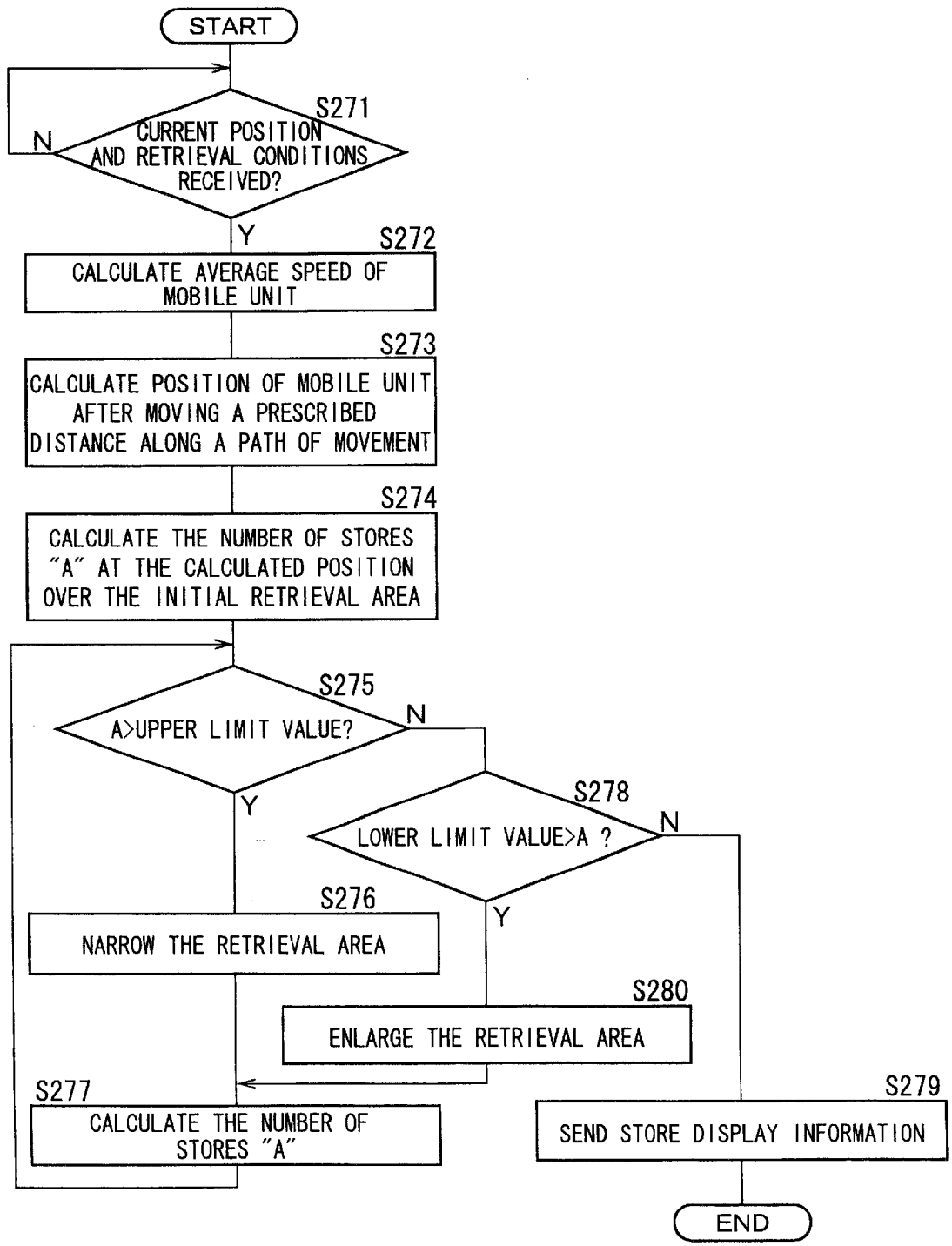
FIG. 10 is a flowchart showing processing of the store information control apparatus, when the store information control apparatus receives a current position of a mobile unit terminal and retrieval conditions from the mobile unit terminal, according to the first embodiment of the present invention.

FIG. 10 is a flowchart showing processing performed when the store information control apparatus 202 receives the current position and current retrieval conditions from a mobile unit 206. When the communication apparatus 211 receives the current position and retrieval conditions of the mobile unit 206 (Y result at step S271), the computer provided within the store information control apparatus 202 calculates the average speed of the mobile unit 206 (step S272). The calculation of the average speed thereof is performed based on the position of the mobile unit 206 and time previously stored, and the current position and time. The term average speed used herein refers to the average of the speed within a horizontal plane.

In the calculation of the average speed of the mobile unit 206, a large curve of the road is taken into consideration. For example, the mobile unit 206 is currently positioned at the point 291 on the road 231 shown in FIG. 8, and there is a large curve between this point 291 and the point 292 which was previously reported as position information. In this case, by tracing back the latitudes and longitudes of the road 231, the actual distance can be predicted. Then using the relationship between the calculated distance and the time required for the mobile unit 206 to travel the predicted path, the speed of travel of the mobile unit 206 at the point 291 is calculated.

It will be readily understood that when the data with regard to the previous time is considerable old, or if the calculated speed of movement is not realistic, rather than using the calculated value, a prescribed processing is performed, based on previous data for that road and time of the day.

After the computer 212 at the store information control apparatus 202 calculates the speed of movement of the mobile unit 206, the computer 212 calculates the position of the mobile unit 206 after moving a prescribed distance along the road 231 (step S273). In this example, the point 293 at which the mobile unit 206 exists on the road 231 after moving from the point 291 by a prescribed distance is determined. The reason for determining the point 293 after movement by a prescribed distance is because of the amount of movement of the mobile unit 206 because of the difference in time between the sending of the position information by the wireless terminal 205 and reception of same, and the time required in retrieving a desired store.

After the point 293 is calculated, the number of stores "A" corresponding to this position is calculated (step S274) At the processing of step S274, a processing to adjust to the number of stores to be displayed set as the retrieval conditions, is performed, and the initial retrieval area is established, and the number of corresponding stores within this initial retrieval area is calculated.

Figure 11:
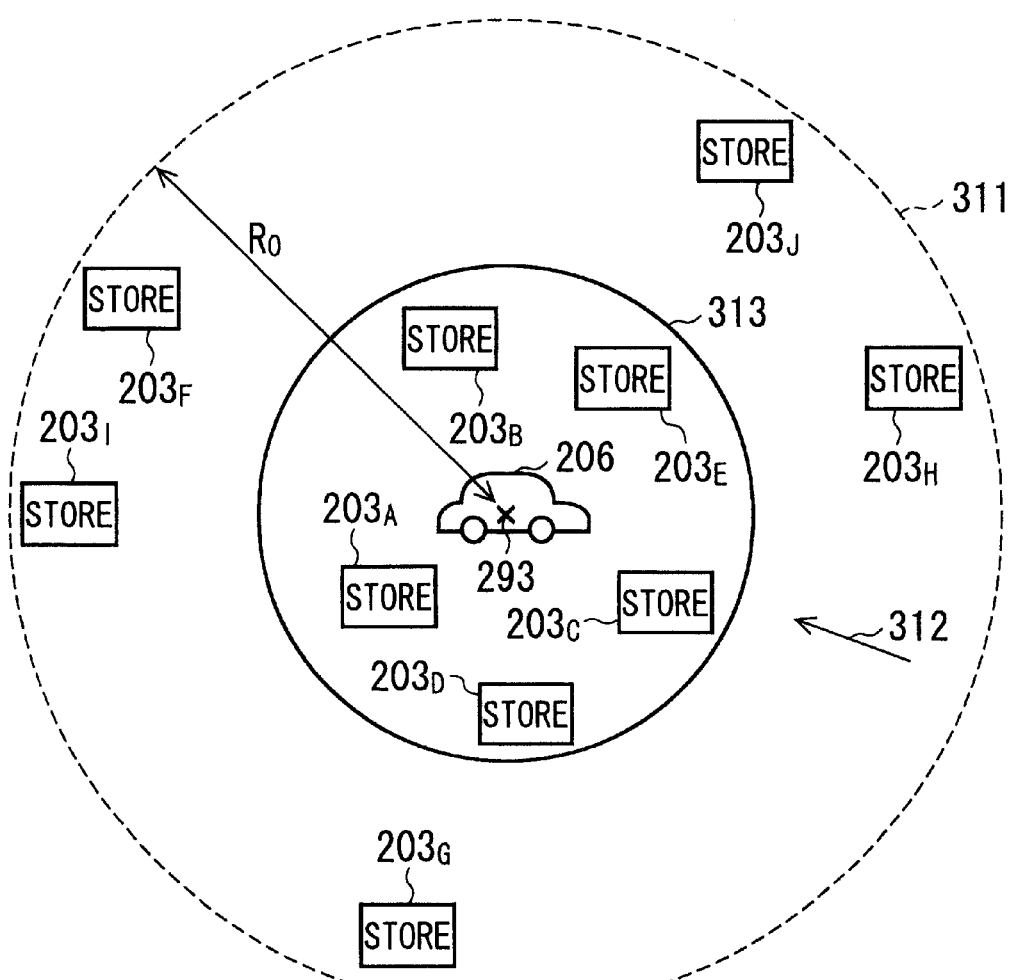
FIG. 11 is a drawing illustrating the first embodiment of the present invention.

FIG. 11 shows the process of the determination of the initial retrieval area. In this case, the number of found stores was greater than the upper limit value 283. In this example, as the initial retrieval area, the circle 311 having a diameter $R_0$ with the center position 293 is established, and the retrieval of the stores within the initial retrieval area 311 are performed using the store database 216. In this search, store $203_A$–$203_J$ are founded. The computer 212 makes a judgment as to whether or not the number of stores found in this search exceeds the upper limit value 283, which is set as a retrieval condition (step S275). In this example, the upper limit is "5" and the number of stores searched is "10", so that the number of stores searched exceeds the upper limit value 283 (Y result), then the new retrieval area 313 that is smaller than the circle 311 is established (step S276), the number of stores "A" corresponding to this area is calculated again (step S277), and the number of stores "A" is compared with the upper limit value 283 (step S275). These steps are repeated, and if ultimately a value "A" is not greater than the upper limit, and a value "A" is greater then the lower limit value 284 (step S278), then the store display information is sent to the wireless terminal 205 (step S279).

In FIG. 11, because the number of stores found using the initial retrieval area 311 exceeded the upper limit value, the retrieval area is successively narrowed in the direction of the arrow 312, so as to make the retrieval area smaller. At the point of reaching the retrieval area 313, within which the number of stores found is within the upper limit value, the store display information indicating the corresponding stores $203_A$ to $203_E$ is sent to the mobile unit 206.

Figure 12:
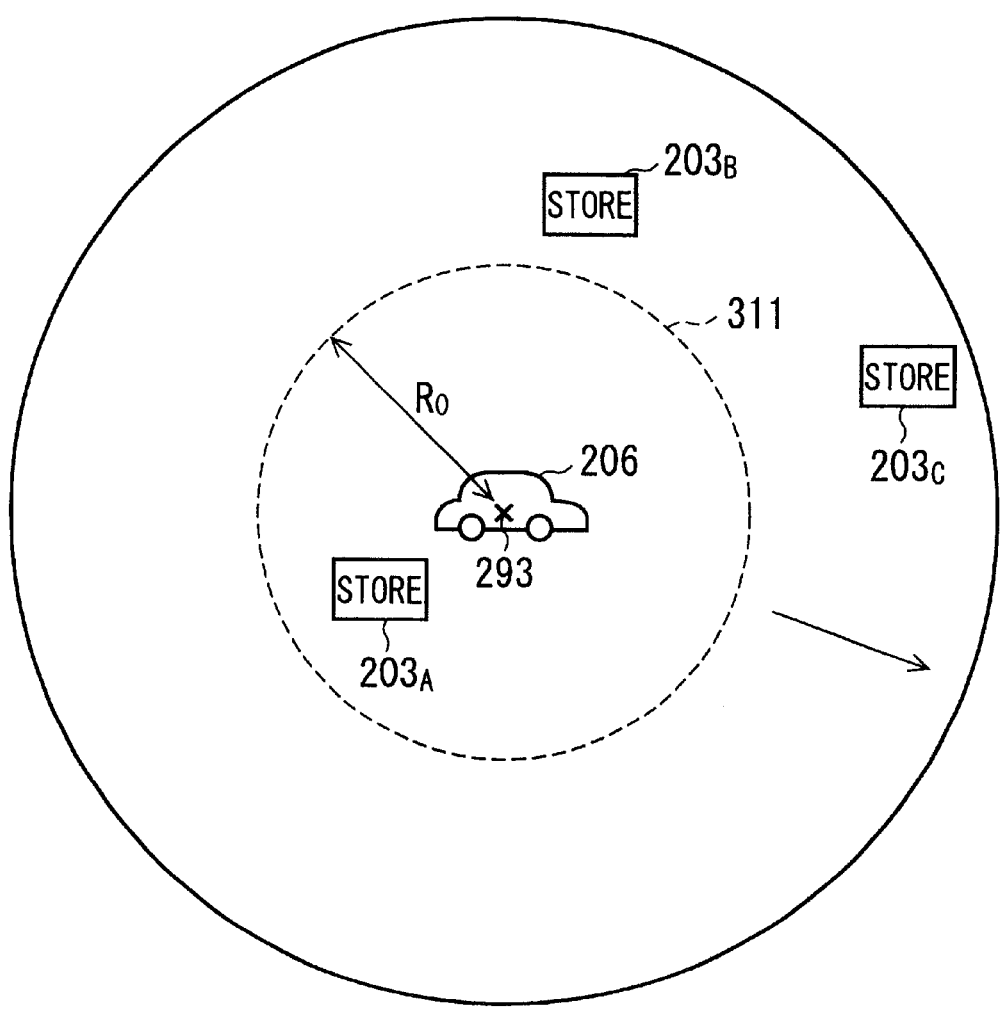
FIG. 12 is a drawing illustrating the first embodiment of the present invention.

FIG. 12 shows the process of the determination of the initial retrieval area. In this case, the number of found stores was smaller than the lower limit value 284. In this case, similar to the case described with reference to FIG. 11, the stores within the initial retrieval area 311 are first subjected to the retrieval. Consider the case in which only one store $203_A$ is found. The computer 212 makes a judgment as to whether or not the number of stores exceeds the upper limit value 283, which is set as a retrieval condition (step S275). Because the number of stores does not exceed the upper limit of 5 (N result), a judgment is made to determine whether or not the number of stores has reached the lower limit value 284 (step S278). In this example, consider the case in which this number is 3, so that the Y result occurs. Because of this condition in this case, the retrieval area is enlarged by one step only (step S280). Then the number of corresponding stores "A" is again calculated (step S277) and, in the case in which this number does not exceed the upper limit value (N result at step S275), the number is further compared with the lower limit value (step S278). These steps are repeated, so that ultimately a value "A", which is not smaller than the lower limit is obtained (N result at step S278), at which point the store display information is sent to the wireless terminal 205 (step S279).

As one example, the case of retrieval using a mobile unit database 215 in FIG. 1 is shown as follows. The store information control apparatus 202, based on the position information sent from the wireless terminal 205, calculates the average speed of the mobile unit 206 as 40 km/hour. From the initial retrieval distances 285 and 286 shown in FIG. 6, the initial retrieval distance $R_0$ of a general road corresponding to an average speed of 40 km is 4.0 km. The movement distance of the retrieval area is ¼ of the initial retrieval distance of 4.0, so that this being 1.0 km.

Figure 13:
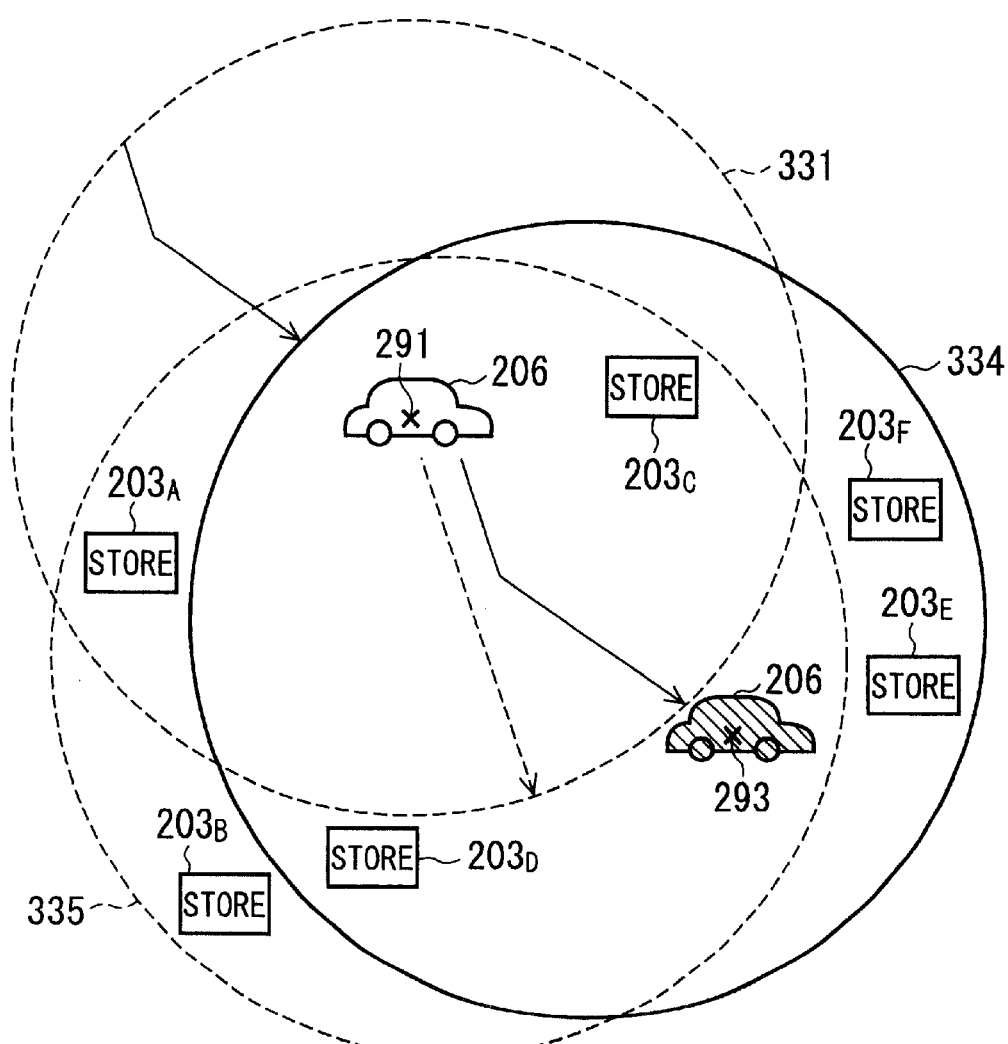
FIG. 13 is a drawing illustrating the first embodiment of the present invention.

FIG. 13 shows an example in which the movement direction and movement path are predicted from the average speed, and the retrieval area is caused to move. The broken line indicates the area 331, which is centered on the current position of the mobile unit 206. Because the movement distance of the retrieval area calculated based on the initial retrieval distance is 1.0 km as shown in the above-noted example, in the case in which the mobile unit 206 moves just this distance along the road 231 shown in FIG. 8, the stores 203 within the target area of the retrieval change, accordingly. In this drawing, the retrieval target area changes to the retrieval area 334 shown by the solid line. As a result, the four stores $203_C$ to $203_F$ are found by the retrieval.

If rather than adopting this type of method for predicting the path of movement, the movement direction is simply used to set the area 335, in this example the two stores $203_A$ and $203_B$ are added, and two other stores, $203_E$ and $203_F$ are removed, so that it is not possible to obtain the retrieval results for a circle centered about the point 293, through which the mobile unit 206 actually passes.

Figure 14:
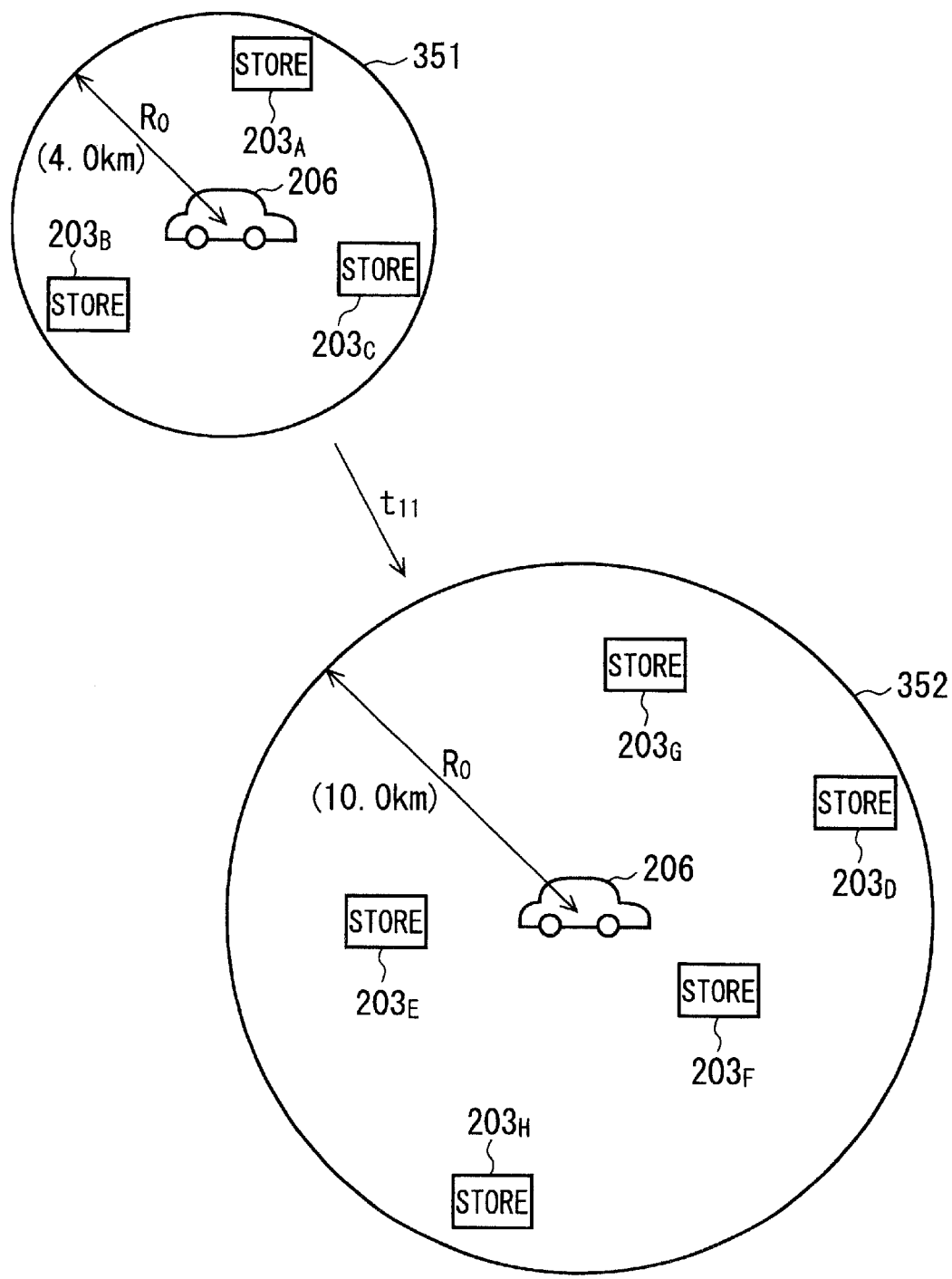
FIG. 14 is a drawing showing an example of changing the retrieval area in accordance with the speed of the mobile unit terminal, according to the first embodiment of the present invention.

FIG. 14 is shows an example in which the initial retrieval distance is changed in accordance with the speed of movement of the mobile unit. Consider the case in which the mobile unit 206 is initially moving at a slow speed of 40.0 km/hour. In this case, the initial retrieval distance $R_0$ from the database shown in FIG. 6 is 4.0 km, and the retrieval area 351 is relatively small. Consider the case in which the mobile unit subsequently increases its speed of movement, so that $t_{11}$ later its speed of movement is 60.0 km/hour or greater. In this case, proportional to the increase in the distance traveled by the mobile unit 206 per unit time, there is an increase in the number of stores found by the retrieval. Therefore, the initial retrieval distance $R_0$ is changed to 10.0 km, so that the target area for retrieval is the relatively large area 352.

In the case in which the number of stores to be retrieved is not dependent upon the speed of movement of the mobile unit 206, there is, of course, no need to make the area for retrieval larger. In this embodiment, however, because the retrieval area is set to ¼ of the initial retrieval distance Rot with the change of the initial retrieval distance $R_0$ to 10.0 km, the movement distance is increased 2.5 times.

Figure 15:
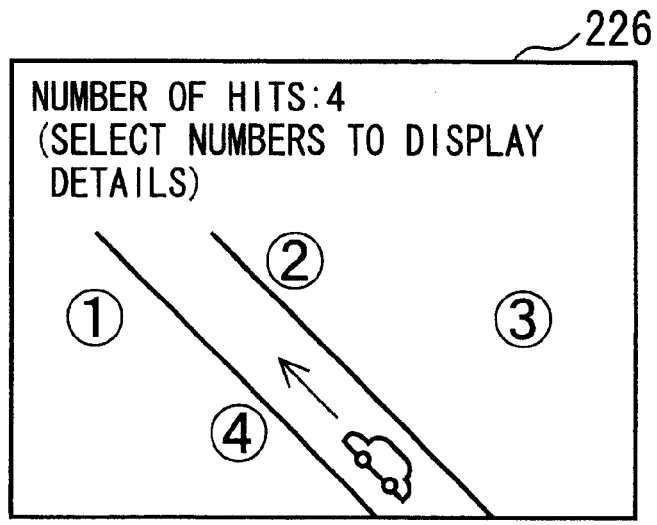
FIG. 15 is a drawing showing an example of the store information displayed by a display unit of the wireless terminal of a mobile unit terminal.

FIG. 15 shows an example of store display information displayed on the display unit of the wireless terminal of the mobile unit. In this example, the retrieval is performed for at least 3 restaurants but no more than 5 restaurants. The display unit 226 indicates that there were 4 hits on the retrieval, in addition to indicating the location of the 4 restaurants by numbers indicating each of the restaurants. By indicating a number of a restaurant from a operating panel (not shown in the drawing), it is possible to display details of any of the displayed restaurants.

Figure 16:
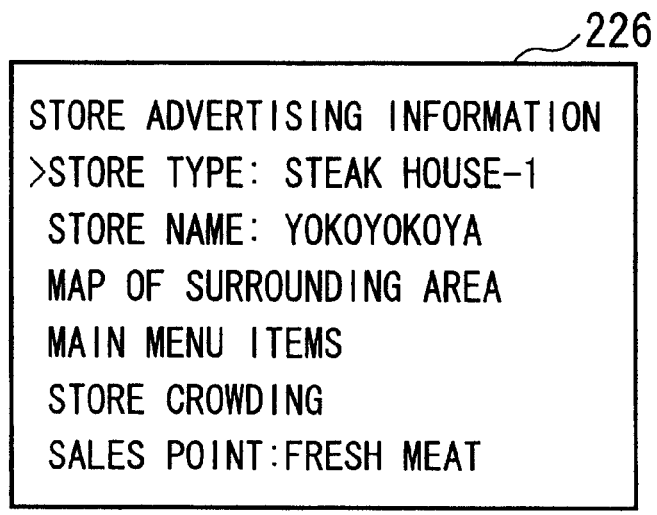
FIG. 16 is a drawing showing the detail store information displayed by a display unit of the wireless terminal of a mobile unit terminal.

FIG. 16 shows the display of detail store information for one of the hits (restaurants) in FIG. 15 on the display unit of the wireless terminal. The display unit 226 shows information extracted from the store information stored in the store database 214 as shown in FIG. 1. If the display unit 226 has a relatively large display surface area or a high resolution, it is possible also to display detailed information on the screen as shown in FIG. 15.

(Second Embodiment)

Figure 17:
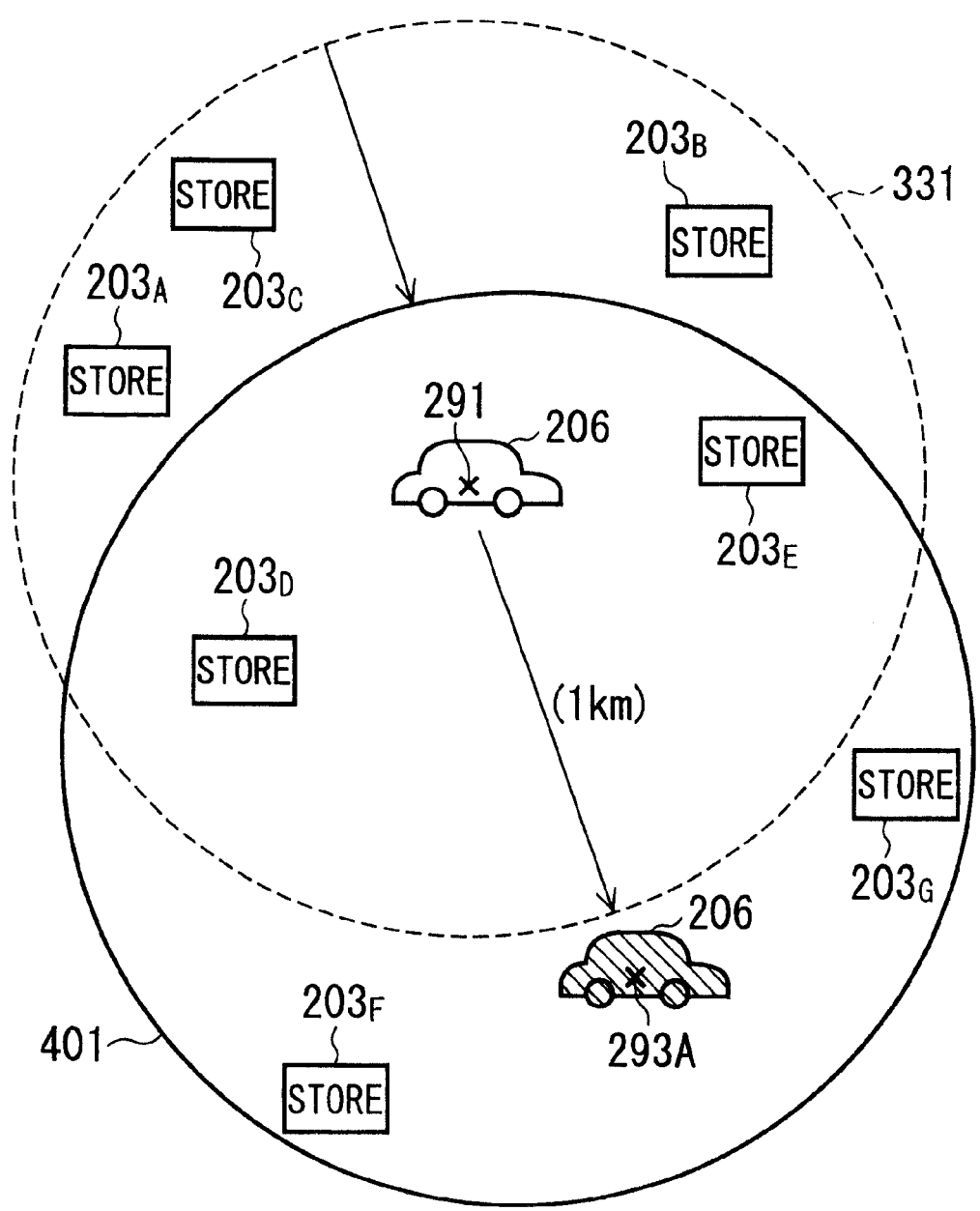
FIG. 17 is a drawing illustrating a second embodiment of the present invention.

FIG. 17 shows a store information display system according to a second embodiment of the present invention, in which elements the same as those in the embodiment shown in FIG. 13 are assigned the same reference numerals and are not explicitly described herein.

In the second embodiment, in the case in which the curves in the road are uncertain, the case in which the mobile unit 206 is traveling over a wide open area, or the case in which a user of a portable wireless terminal 204 such as shown in FIG. 1 is walking along a private road not included in the map database, the computer 212 shown in FIG. 1 checks the history of travel and simply makes a judgment about the speed and direction of movement from the movement speed and current movement direction, the retrieval area 401 being set based on these.

It is alternatively possible, of course, in a simplified store information display system not having a detailed map database, rather than to perform complex control, such as prediction of the movement of a mobile unit 206 along a road, to perform control such as shown in FIG. 17.

(Third Embodiment)

Figure 18:
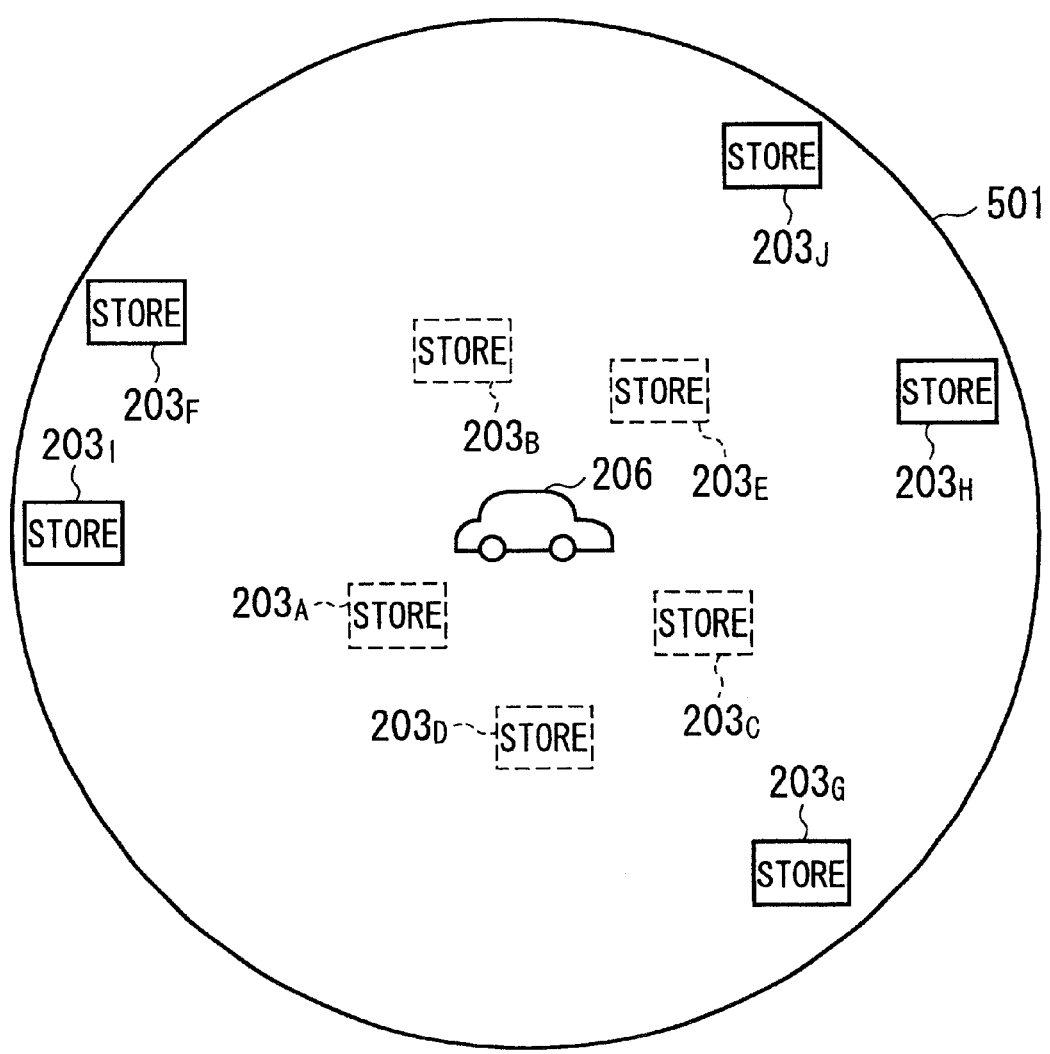
FIG. 18 is a drawing illustrating a third embodiment of the present invention.

FIG. 18 shows the relationship between the retrieval area and the retrieval target area in a store information display system according to a third embodiment or the present invention. When a user seeking to retrieval stores in a location having a relatively large number of target stores, and perform a retrieval in a location that is close to a previous location, it is often desirable that the previously found retrieval results not be repeated displayed. In this third embodiment, the 5 stores $203_F$ to $203_J$ found in the last retrieval are displayed, but the 5 stores $203_A$ to $203_E$ found on the previous retrieval are not displayed. For this reason, the retrieval area 501 is larger than the previous retrieval. In this third embodiment, this type of additional subsequent retrieval is referred to as an additional retrieval.

Figure 19:
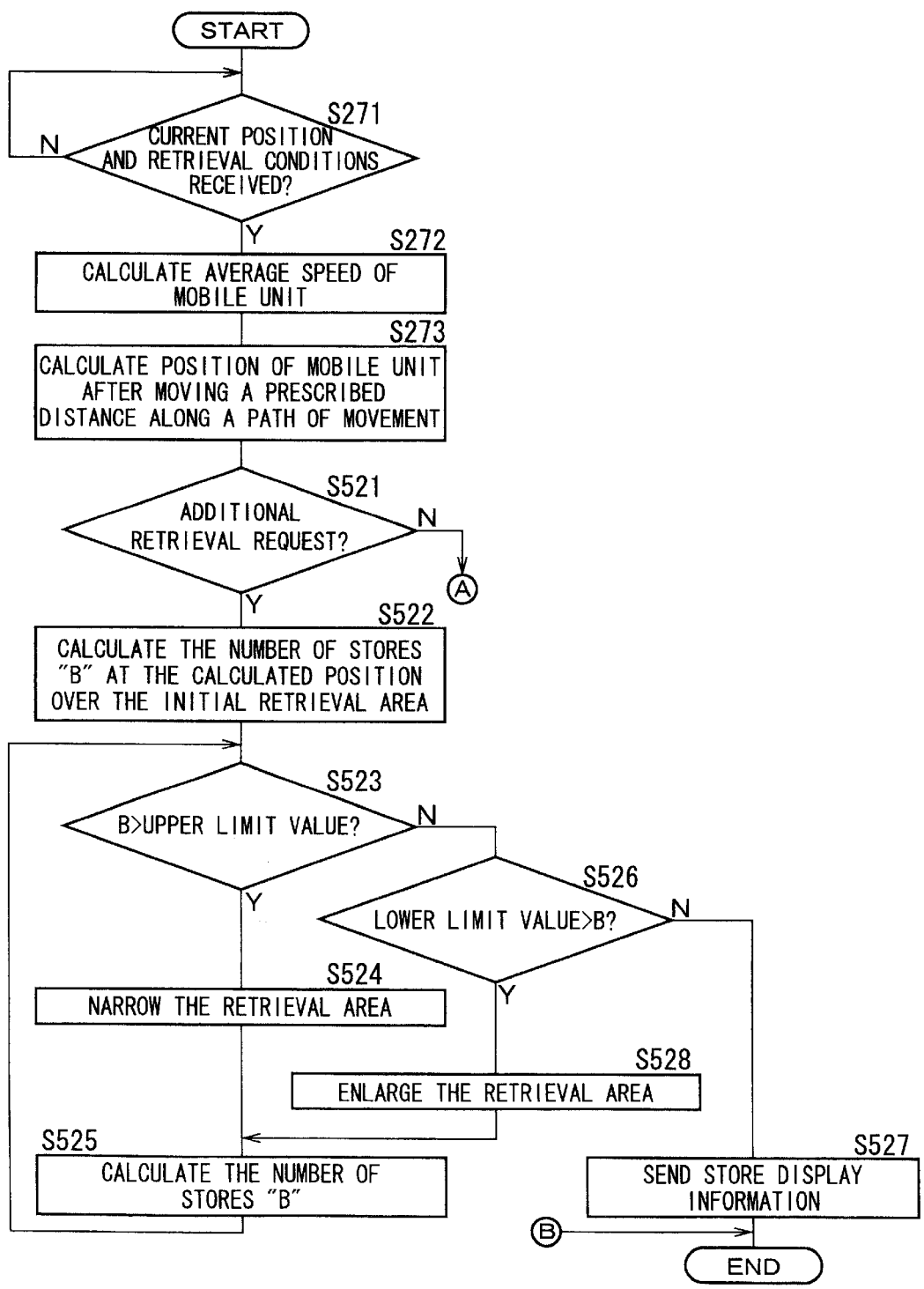
FIG. 19 is a flowchart showing processing of the store information control apparatus, according to the third embodiment of the present invention.
Figure 20:
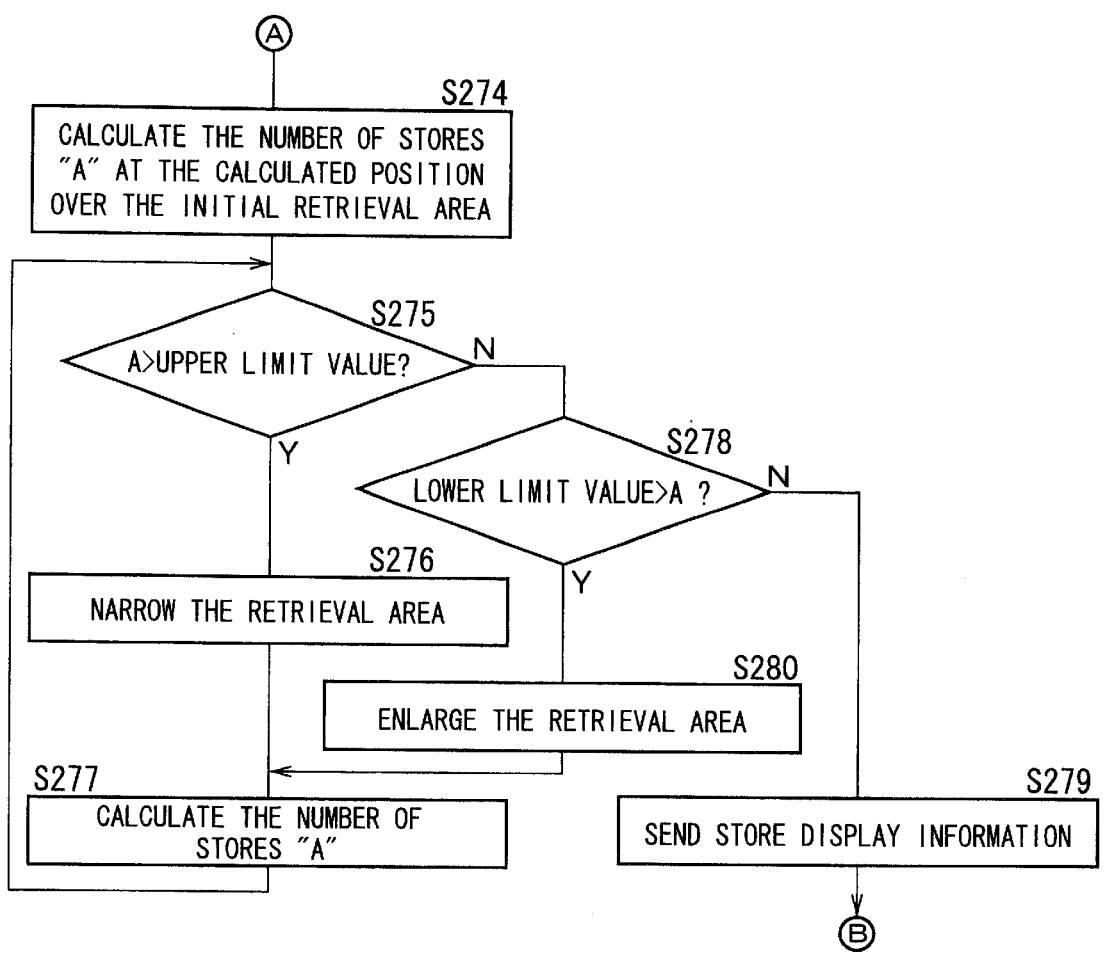
FIG. 20 is a flowchart showing processing of the store information control apparatus, according to the third embodiment of the present invention.

FIG. 19 and FIG. 20 are flowcharts which include the additional retrieval. In FIG. 19 and FIG. 20, elements similar to elements in FIG. 10 are assigned the same reference numerals and are not explicitly described herein. When the communication apparatus 211 receives the current position of the mobile unit 206 and the retrieval conditions (Y result at step S271), the computer 212 provided within the store information control apparatus 202 calculates the average speed of the mobile unit 206 (step S272).

When the computer 212 at the store information control apparatus 202 calculates the movement speed of the mobile unit 206, it calculates the position thereof after it has moved a prescribed distance along its path of movement (step S273) In this manner, a position is determined that is not far from the previously determined point 293.

Once this point has been calculated, a check is made as to whether or not the retrieval conditions received at step S271 request an additional retrieval (step S521). In the case in which there was no request for an additional retrieval, the processing of step S274 and thereafter is performed. The processes of step S274 to step S280 are same as steps shown in FIG. 10.

If, however, the judgment at step S521 was that there was a request for an additional retrieval (Y result), an additional number of stores "B", except for store information sent on the previous retrieval as store display information, is calculated (step S522). In the processing at step S522, the first task performed is the setting of an initial retrieval area for adjusting the number of displayed stores to the retrieval conditions, so that the number of stores corresponding to this initial retrieval area is calculated. The initial retrieval area can be the same area as that which is set at the step S274, but it is effective to set this initial retrieval area slightly larger. Whether or not a store is the same as a store that was displayed the last time as store display information is judged by examining the history information stored in a RAM (random-access memory) in the computer 212.

The computer 212 makes a judgment as to whether or not the number of found stores exceeds the upper limit value set as a retrieval condition (step S523). In the case in which the number of hits exceeds the upper limit value (Y result), the retrieval area is reduced by one step (step S524). The number of store is then again calculated (step S525), and this number is compared with the upper limit value (step S523). This is repeated, and ultimately when a value of "B" is obtained that does not exceed the upper limit value (N result at step S523), a check is made to see if this number is not smaller than the lower limit value (N result at step S526), after which this is sent to the wireless terminal 205 as store display information (step S527).

In the case, however, in which the number of store hits was smaller than the lower limit value set as a retrieval condition (Y result at step S526), the retrieval area is enlarged by one step (step S528). The number of store is again calculated (step S525), and if this newly calculated number does not exceed the upper limit value (N result at step S523), this is compared with the lower limit value (step S526). This is repeated until finally a value of "B" that is not smaller than the lower limit value is obtained (N result), retrieval results being sent to the wireless terminal 205 as store display information (step S527).

By performing the above-noted processing, in the example shown in FIG. 18, in the retrieval area that is somewhat enlarged from the previous time, the 5 new stores $203_F$ to $203_J$ other than the already displayed stores $203_A$ to $203_E$ are displayed.

(Fourth Embodiment)

Figure 21:
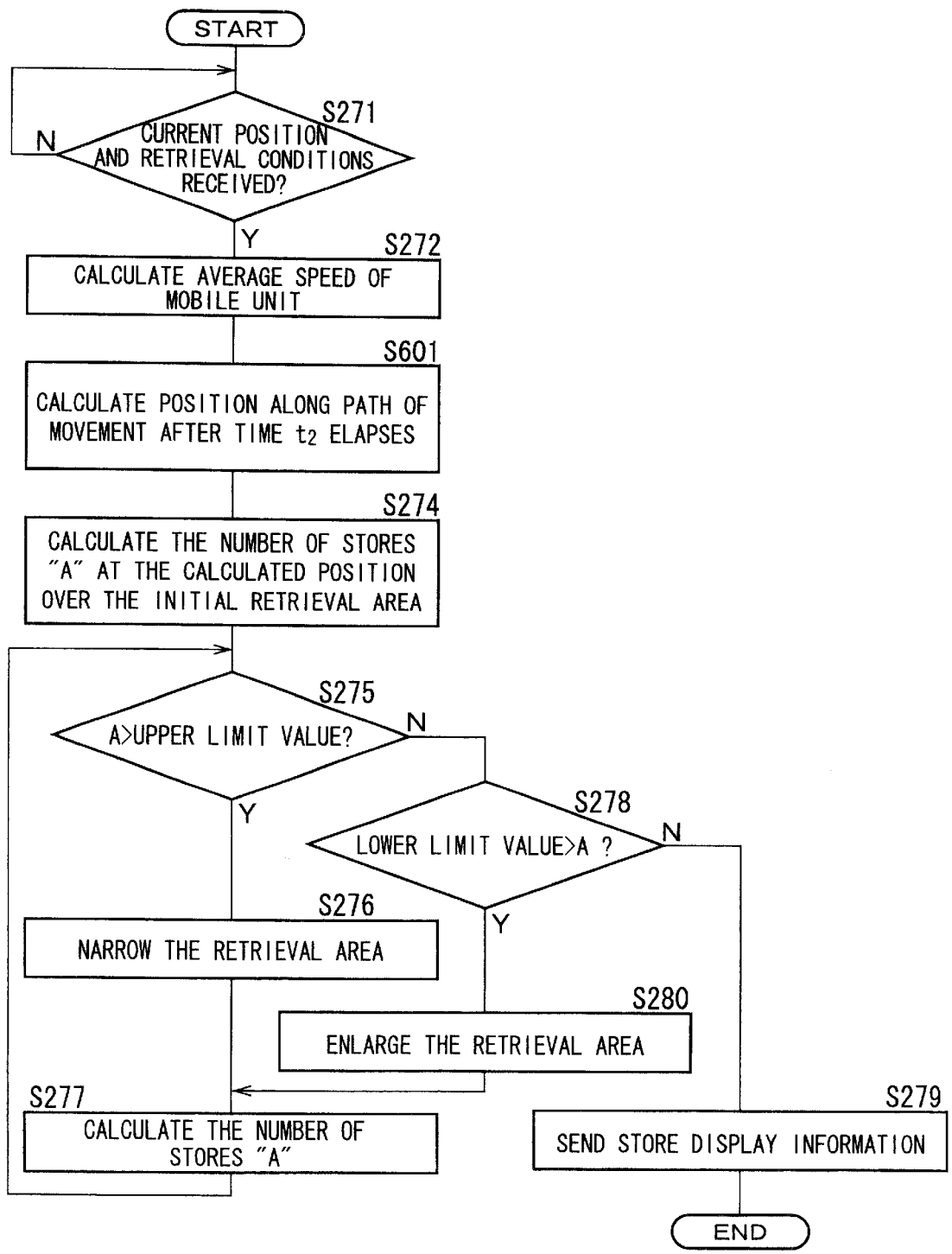
FIG. 21 is a flowchart showing processing of the store information control apparatus, according to the third embodiment of the present invention.
Figure 22:
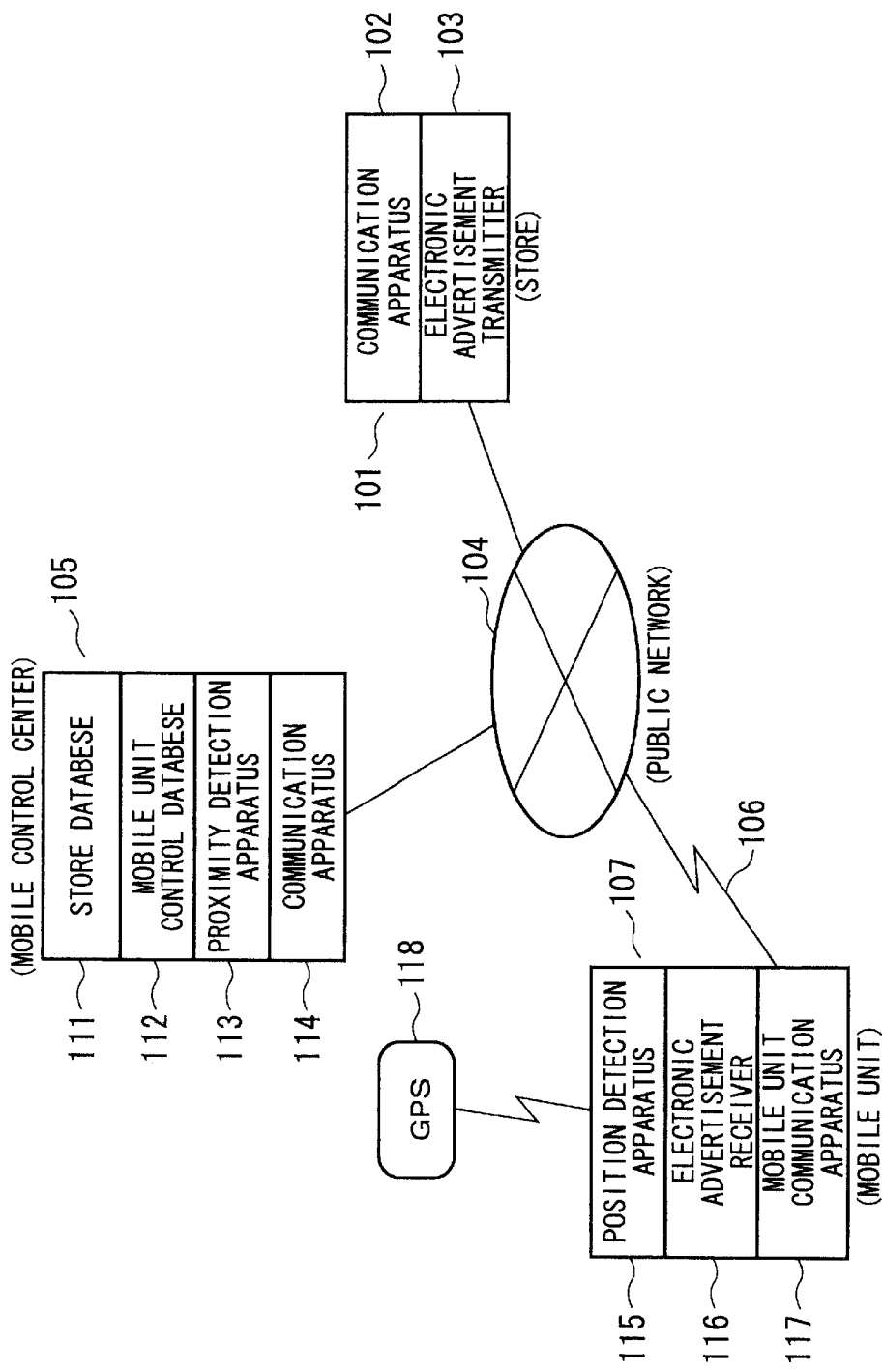
FIG. 22 is a block diagram of a conventional store information display system.

FIG. 21 is a flowchart illustrating the fourth embodiment of the present invention. In this drawing, elements similar to elements in FIG. 10 are assigned the same reference numerals and are not explicitly described herein.

In this fourth embodiment, in place of the processing at step S273 in FIG. 10, the position after the mobile unit 206 moves for a time $t_2$ along its path of movement, is calculated (step S601), with other aspects being the same as shown in FIG. 10.

The time $t_2$ is set as a prescribed default value, and it is further possible for the user to set this time to 0, or to any value, whether positive or negative, as appropriate. If the time $t_2$ is set long, it is possible to obtain information for stores about a center position that is a position commensurately forward in the direction of travel.

The time $t_2$ can be set to be negative, as a convenient method of instantly checking details of a store just spotted at the roadside, for example. If the time t2 is set to 0, the calculation processing at step S272 can be omitted.

Although in the foregoing descriptions of embodiments of the present invention, the present invention detects the position of a mobile unit or the like using a GPS communication satellite 208, it will be understood that it is alternatively possible to detect the position using a base station 207. Depending upon the method of position detection employed, it might not be necessary for each of the mobile unit terminals to give notification of its own position to the store information control apparatus 202 which is performing the store retrieval.

According to the present invention, it is possible to perform retrieval of nearby stores, taking into consideration movement of the mobile unit terminal, thereby not only enabling optimization of the number of stores, but also making it possible to obtain easy-to-use store information.

What is claimed is:

1. A store information display system comprising:
   a communication network;
   a mobile unit terminal, connected to said communication network, having position detection means which detects position thereof;
   a store information control apparatus, connected to said communication network;
   a receiving means, provided in said store information control apparatus, for receiving positioning data detected by said position detection means and retrieval conditions with respect to a request of a retrieval of store information from said mobile unit terminal;
   a store information retrieval means, provided in said store information control apparatus, for establishing a retrieval area in a direction of travel of said mobile unit terminal based on said received positioning data of said mobile unit terminal and said retrieval conditions, and performing retrieval of stores information within said retrieval area;
   a retrieval area adjusting means, provided in said store information retrieval means, for adjusting dimensions of said retrieval area in accordance with retrieval conditions received from said mobile unit terminal; and
   a stores information transmitting means, provided in said store information control apparatus, for transmitting stores information founded by said store information retrieval means to said mobile unit terminal.

2. The store information display system according to claim 1, wherein said retrieval area is a region surrounded by a circle.

3. The store information display system according to claim 1, wherein a center of said retrieval area is established based on a traveling speed of said mobile unit terminal.

4. The store information display system according to claim 1, wherein a center of said retrieval area is a location at which said mobile unit terminal has moved a prescribed distance along a path of movement thereof after receiving a request for store information retrieval from said mobile unit terminal.

5. The store information display system according to claim 1, wherein said retrieval conditions includes upper limit value which limits a number of store information displayed on said mobile unit terminal, said retrieval area adjusting means adjusting said dimensions of said retrieval area in accordance with said upper limit value and a number of store information founded by last retrieval.

6. The store information display system according to claim 1, wherein said retrieval conditions includes lower limit value which limits a number of store information displayed on said mobile unit terminal, said retrieval area adjusting means adjusting said dimensions of said retrieval area in accordance with said lower limit value and a number of store information founded by last retrieval.

7. A display method of a store information using a store information display system comprising a communication network, a mobile unit terminal, connected to said communication network, having position detection means which detects position thereof, and a store information control apparatus connected to said communication network, said method comprising the steps of:
   receiving a request for store information retrieval, positioning data detected by said position detection means and retrieval conditions with respect to said retrieval of store information from said mobile unit terminal;

calculating a traveling speed of said mobile unit terminal;

calculating a location to which said mobile unit terminal has moved by a prescribed distance along a path of movement thereof after receiving said request for store information retrieval from said mobile unit terminal;

establishing a retrieval area in a direction of travel of said mobile unit terminal based on said received positioning data of said mobile unit terminal and said retrieval conditions;

performing retrieval of stores information within said retrieval area;

adjusting dimensions of said retrieval area in accordance with retrieval conditions received from said mobile unit terminal and retrieval results obtained by last retrieval; and transmitting stores information founded by said retrieval to said mobile unit terminal.

* * * * *